United States Patent
Rowe (10) Patent No.: US 7,171,029 B2
(45) Date of Patent: Jan. 30, 2007

(54) METHOD AND APPARATUS FOR GENERATING MODELS OF INDIVIDUALS

(75) Inventor: Simon Michael Rowe, Berkshire (GB)

(73) Assignee: Canon Kabushiki Kaisha, Tokyo (JP)

( * ) Notice: Subject to any disclaimer, the term of this patent is extended or adjusted under 35 U.S.C. 154(b) by 729 days.

(21) Appl. No.: 10/424,919

(22) Filed: Apr. 29, 2003

(65) Prior Publication Data

US 2003/0202686 A1 Oct. 30, 2003

(30) Foreign Application Priority Data

Apr. 30, 2002 (GB) ................................. 0209877.0

(51) Int. Cl.
  G06K 9/00 (2006.01)
  G06T 15/30 (2006.01)
  G01C 3/14 (2006.01)
(52) U.S. Cl. ...................... 382/118; 382/154; 356/12; 345/423
(58) Field of Classification Search ...................... None
  See application file for complete search history.

(56) References Cited

U.S. PATENT DOCUMENTS 6,434,278 B1 * 8/2002 Hashimoto .................. 382/285
2003/0012408 A1 * 1/2003 Bouguet et al. ............ 382/103

OTHER PUBLICATIONS

"Active Appearance Models," T. Cootes, et al., Proc. European Conference of Computer Vision, vol. 1.2, Springer, 1998, pp. 484-498.

* cited by examiner

Primary Examiner—Matthew C. Bella
Assistant Examiner—Charles Kim
(74) Attorney, Agent, or Firm—Fitzpatrick, Cella, Harper & Scinto.

(57) ABSTRACT

In order to avoid the generation of blurred images principle component analysis models (21) are generated by identifying points in the images outlining facial features in the images and creating a triangulation of the face of an individual in which boundaries of the facial features of an individual lie substantially along the edges of triangles in the triangulation. A principle component analysis model (21) is then created using the variation in coordinates of the points forming the triangulation and the differences in image data of the images divided by the triangulations. As the edges of facial features tend to lie along edges of the triangles, morphing of these shapes does not cause these features to be stretched across two triangles and hence variation in facial features such as the shape of eyebrows or eyes is primarily encoded in the variation of location of the vertices of the triangulation rather than differences in the generated morphed images used to determine coloring for generated models.

26 Claims, 9 Drawing Sheets

METHOD AND APPARATUS FOR GENERATING MODELS OF INDIVIDUALS

BACKGROUND OF THE INVENTION

1. Field of the Invention

The present application relates to methods and apparatus for generating models of individuals. In particular, embodiments of the present application relate to methods and apparatus for modelling individuals using principle component analysis.

2. Related Background Art

There are many applications for computer systems that are able to generate recognisable images of individuals. These applications range from systems for displaying the face of a caller on a telephone through to computer graphics generated within computer games. One known method of modelling human faces is using principle component analysis, an example of which is disclosed in 'Active Appearance Models' Cooks et. al., Proc. European Conference of Computer Vision 1998, Vol 1.2, pp. 484–498, Springer, 1998.

In order to generate a model of the way in which faces vary, a large data set of different faces is first obtained. Feature points on the faces are then identified so that an average face can be determined. The manner in which each individual face used to generate the model varies from this average face can then be identified and the results subjected to principle component analysis to determine the most significant ways in which faces within the data set vary.

By generating a model of an individual face using a limited number of the most significant variations, a reasonable approximation of a specific individual face can be generated.

SUMMARY OF THE INVENTION

Although a computer model derived from principle component analysis of a large number of faces can be used to form a relatively compact representation of a particular person, if only a few parameters are used to model a face sometimes this results in the generation of a blurred image. It is desirable to provide a system in which a high quality model of an individual face can be represented in as few parameters as possible and where the images generated are sharp. Further it is desirable that a model of an individual face can be generated quickly and easily.

In accordance with one aspect of the present invention, there is a method of generating a principal component analysis model for representing individuals, comprising the steps of:

obtaining a plurality of images of individuals;

marking up each of said images of individuals;

identifying points in said images corresponding to points outlining facial features in said images;

determining utilising said points for each image a division of each said image into a number of image potions wherein the boundaries of said facial features lie substantially along the edges of said image portions; and generating a principle component analysis model utilising the variations in said determined divisions and the corresponding image portions for different images of said plurality of images.

In accordance with a further aspect of the present invention there is provided a method of generating a set of weighting values for creating a model of the face of an individual comprising the steps of:

storing a principle component analysis model generated utilising images of a plurality of faces in which co-ordinates of points on the outlines of facial features are identified;

receiving an image of the face of an individual and identifying the co-ordinates of points on the outlines of facial features in said image; and processing said image data and said co-ordinates utilising said stored principle component analysis model to generate a set of weighting values for creating a representation of said individual in said image;

wherein image data and co-ordinates used to generate said principle component analysis model and said image data and co-ordinates of said points in received images, are processed by utilising said points to generate triangulations of the faces in said images in which edges of triangles connecting said co-ordinates outline facial features appearing in said images.

BRIEF DESCRIPTION OF THE DRAWINGS

Further aspects of the present invention will become apparent with reference to the accompanying drawings in which.

DETAILED DESCRIPTION

First Embodiment

Figure 1:
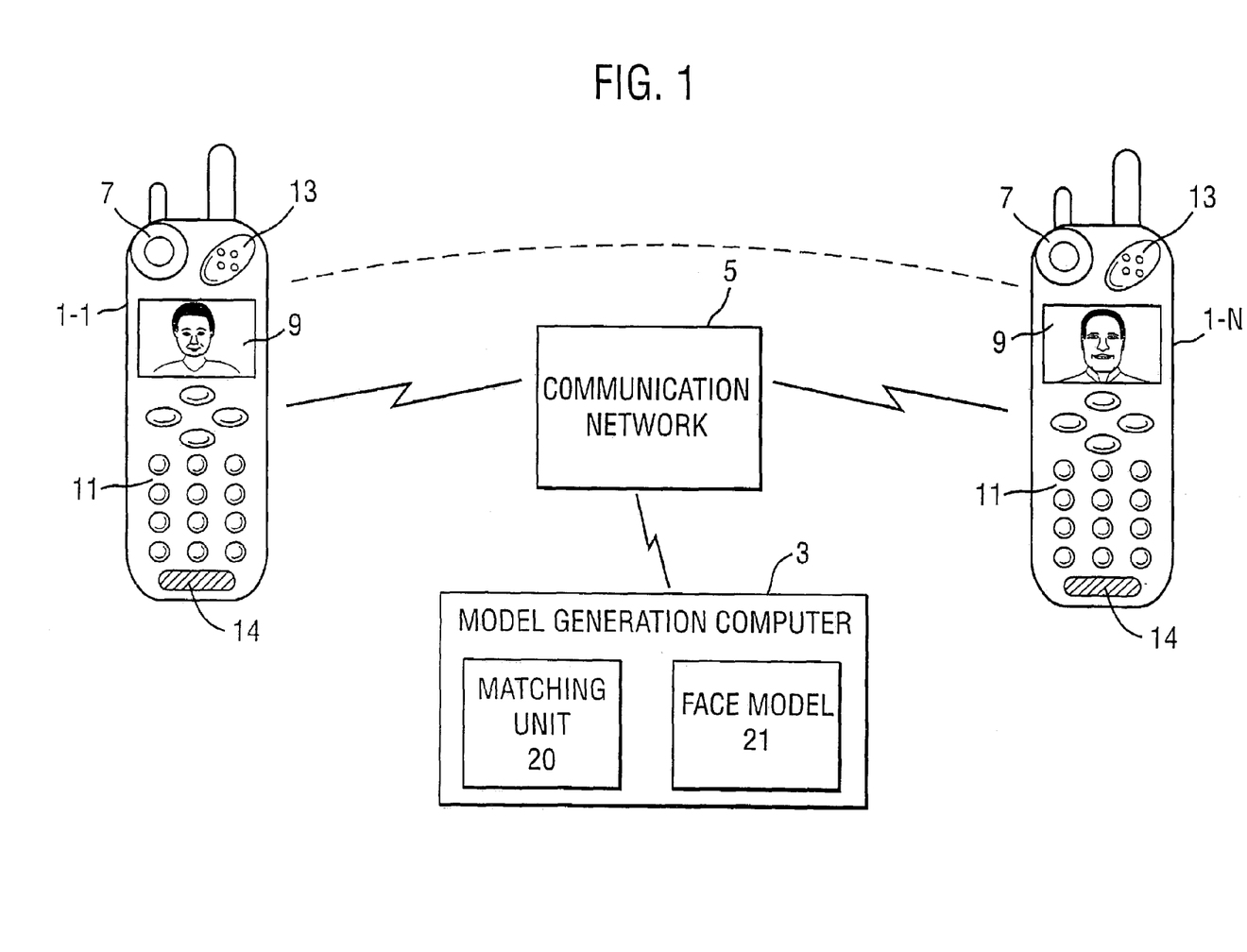
FIG. 1 is a schematic block diagram of communications system including a model generation computer in accordance with a first embodiment of the present invention.

FIG. 1 is a schematic block diagram of a communications system incorporating a face modelling system in accordance with the present invention. The communications system comprises a plurality of mobile telephones 1-1-1-N that are connected to each other and to a model generation computer 3 via a communications network 5. Each of the mobile phones 1-1; 1-N is adapted to enable an image of a caller to be displayed and comprises a camera 7 for taking pictures of the user of the phone 1-1; 1-N; a screen 9 for displaying an image of the face of an individual calling the mobile phone 1-1; 1-N, a keyboard 11, a loudspeaker 13 and a microphone 14.

The model generation computer 3 in accordance with this embodiment of the present invention is arranged to convert image data of faces received from the mobile phones 1-1; 1-N into weighting values for high quality compact model representations of the received faces. Specifically, the model generation computer 3 is arranged to generate weighting values comprising Eigen values for a principle component analysis model which generates sharp images of individuals. This is achieved as will be described in detail later, by the model generation computer 3 comprising a matching unit 20 arranged to identify outlines of facial features appearing in received images; and a face model 21 being a principle component analysis model generated from faces in which outlines of features appearing in received images have been identified. A similar face model is also stored as part of an image generation module (not shown in FIG. 1) provided as part of each of the phones 1-1-1-N.

In use, when an individual acquires one of the mobile telephones 1-1; 1-N, the individual first takes a picture of themself using the camera 7 of the mobile phone 1-1; 1-N. The individual then sends a copy of the obtained image to the model generation computer 3 via the communications network 5. When this image data is received by the model generation computer 3, the model generation computer 3 processes the received image data of an individual using the stored face model 21 to calculate a set of weighting values for modeling the received image. The set of weighting values are then returned to the individual's mobile phone 1-1; 1-N.

Subsequently, when the individual uses their mobile phone 1-1; 1-N to make a telephone call, these weighting values are transmitted to a receiver's telephone 1-1; 1-N where the weighting values are processed utilising the face model (not shown in FIG. 1) stored on that phone 1-1; 1-N so that an image of the caller can be displayed on the screen 9 of the recipient's telephone.

The model generation computer 3 of the present embodiment provides a modeling system that is efficient and enables an image of an individual face to be represented using a limited number of parameters. The inventors have appreciated that many of the principle component analysis vectors of prior art systems encode variation in faces which arises due to high frequency features present in images. As such features do not vary significantly from face to face, many of the vectors encoding such variations are ignored when generating model images. Although ignoring such vectors when generating images is efficient, the quality images generated in this way can be unsatisfactory.

The loss of high frequency features is particularly noticeable along boundaries outlining facial features. Failure to encode high frequency variations in these portions of an image causes the outlines of these features to become blurred. In order to avoid this problem the face model 21 and matching unit 20 of the model generation computer 3 are arranged to encode images using principle component analysis in a manner which ensures that the boundaries outlining facial features remain sharp as will now be described in detail.

Figure 2:
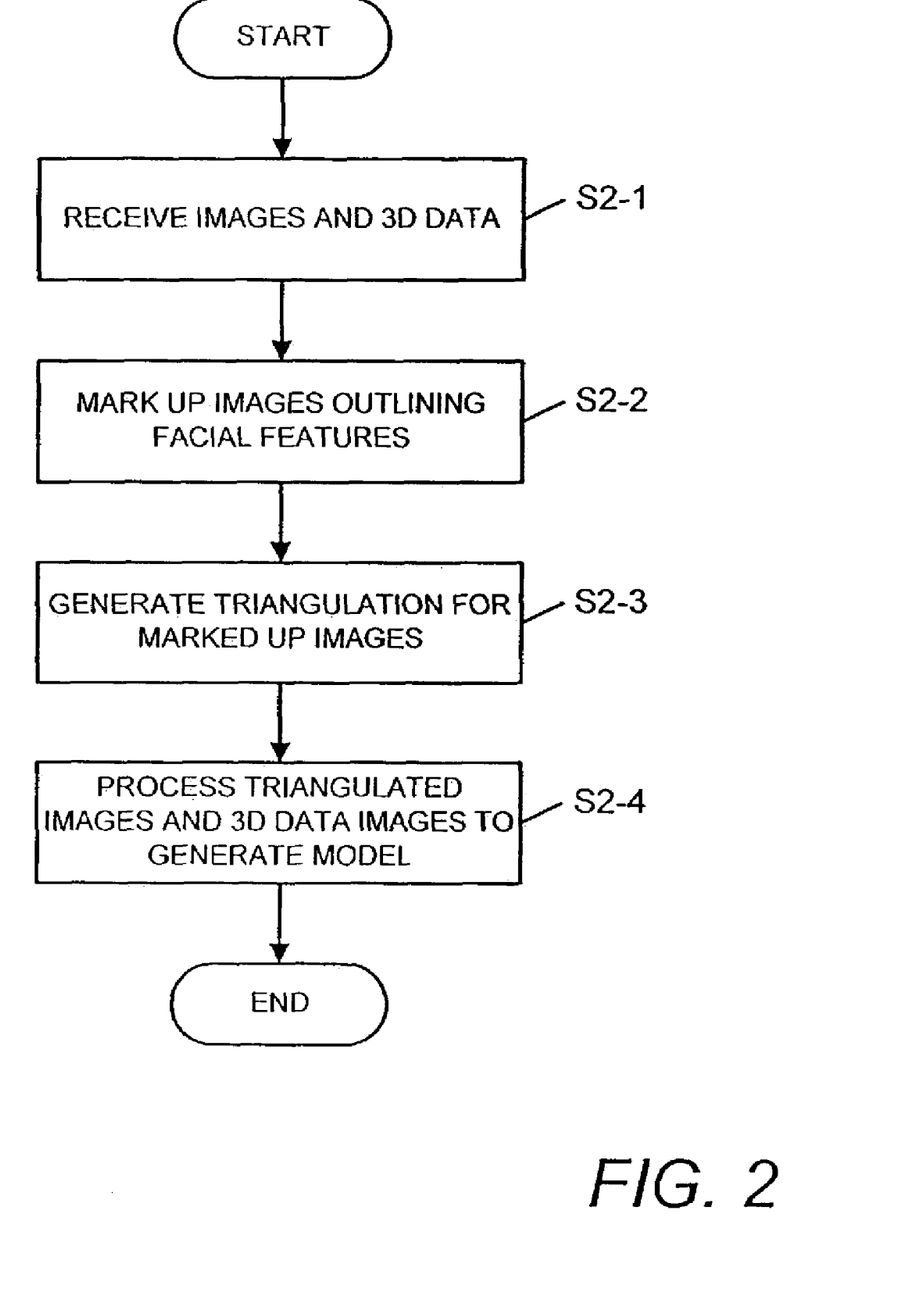
FIG. 2 is a flow diagram of the generation of a face model in accordance with an embodiment of the present invention.

FIG. 2 is a flow diagram of the steps involved generating the face model 21 of the model generation computer 3 in accordance with this embodiment of the present invention. As will be described later copies of this face model 21 are also stored in the image generation module of each of the mobile phones 1-1; 1-N.

In this embodiment where a face model 21 for generating three dimensional principle component analysis models is to be created from received images, initially (S2-1) a large number of images of faces of individuals are received together with three dimensional measurements of the faces appearing in the images.

Figure 3:
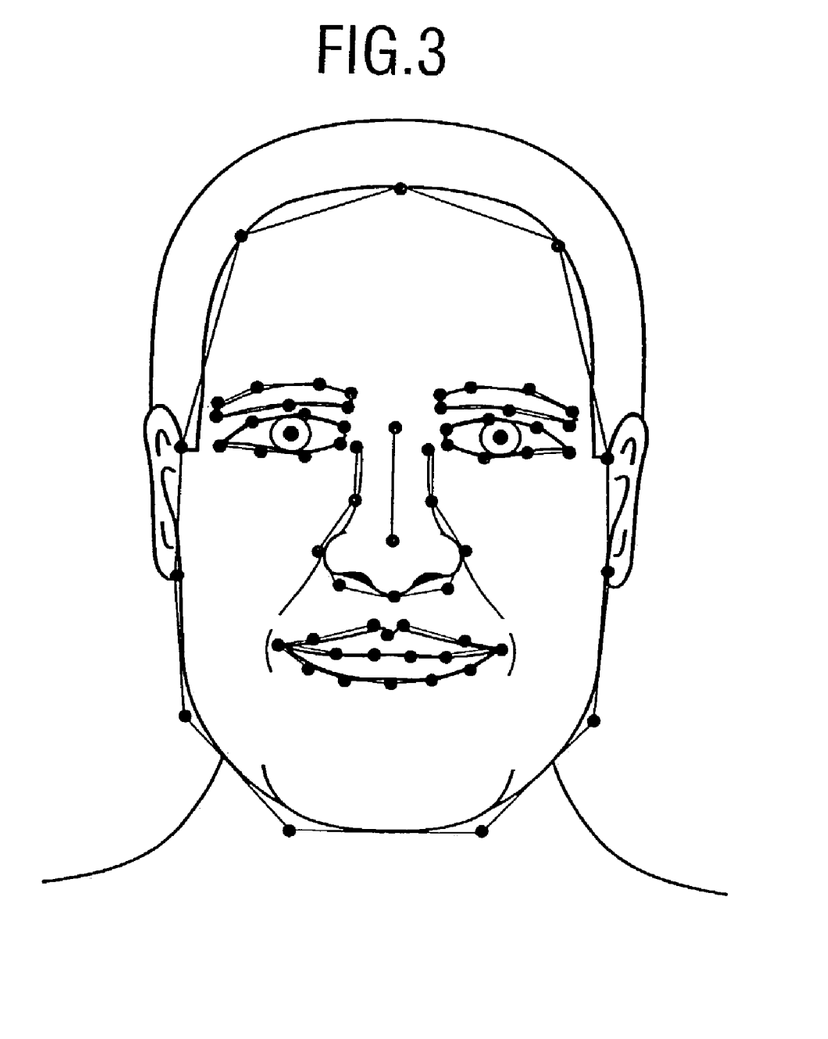
FIG. 3 is an exemplary illustration of a marked up face in which points identifying the outlines of facial features are highlighted.

The received images are then (S2-2) marked-up either manually or automatically by identifying points in the images corresponding to the outlines of facial features in the images. An example of a marked-up face is shown in FIG. 3. In the example of FIG. 3 the outlines of facial features marked-up on the image comprise outlines of the shape of the face and, outlines around the eyes, eyebrows, nose and mouth. Additionally marked-up on the image of FIG. 3 are the centres of the eyes, two points defining the bridge of the nose and the further four points lying along the lipline of the face in FIG. 3. Where an image is automatically marked up conventional feature recognition techniques can be used to determine the locations of these points.

When received images have been marked-up (s2-2) the model generation computer 3 then (s2-3) proceeds to generate a triangulation of the image utilising the co-ordinates of the points defining the outlines.

Figure 4:
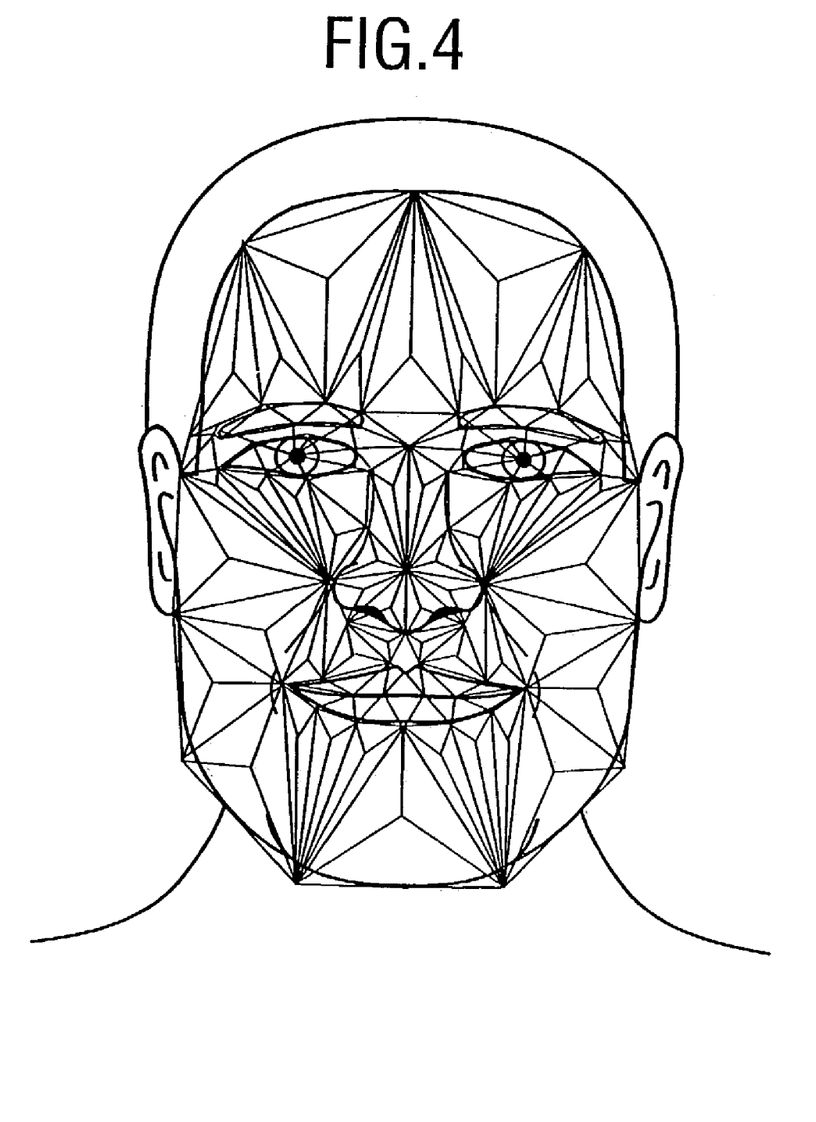
FIG. 4 is an exemplary illustration of a triangulation of an image generated utilising the points marked in FIG. 3.

FIG. 4 is an example of a triangulation generated utilising the points marked-up on the image of FIG. 3. In the example of FIG. 4 the generated triangulation is created by initially connecting points corresponding to points marked-up on the image of FIG. 3 in a predetermined manner and then further sub-dividing some of the triangles generated utilising this initial sparse triangulation. Specifically, when generating the triangulation adjacent points outlining facial features are connected and then connections are made between the closest points outlining of different features. Some of the larger triangles generated in this way are then further sub-divided. The triangulation of the image generated in this manner is such that in the image, the boundaries of facial features such as the eyes, eyebrows nose and lips tend to lie along or very close to the edges of triangles in the generated triangulation.

The co-ordinates of the dense triangulation generated from the marked-up images are then processed (S2-4) together with three dimensional data for the points corresponding to the vertices of the triangulation in a conventional manner to generate a principle component analysis model for the set of received images.

Specifically, initially utilising the three dimensional co-ordinates of the points corresponding to vertices in the triangulation, an average three dimensional face for the set of images and 3D data received is determined. The image data for each of the faces is then morphed using conventional thin plate splines to distort each of the portions of the images within a triangle so that the vertices of the morphed image correspond to the average position for those points in the set of images. A set of Eigen vectors for the manner in which the morphed images and 3D co-ordinates of the vertices of the dense triangulation vary across the faces is then determined. The most significant Eigen vectors together with data identifying the average 3D co-ordinates for the vertices for the dense triangulation of the faces and an average 3D morphed image stored by the model generation computer 3 as the principle component analysis face model 21.

Although a principle component analysis face model 21 generated by the model generation computer 3 does not include all of the Eigen vectors generated from the set of images and 3D measurements, by generating the face model 21 in the manner described above, the blurring of the edges of the facial features is avoided.

In particular, when images are morphed so that the co-ordinates of triangles are relocated to an average position, the process of morphing the images does not significantly blur the edges of facial features in the images. This is because due to the manner in which the triangulation is generated, the edges of the facial features tend to lie along edges of triangles in the dense triangulation. The morphing of the shapes of these triangles using thin plate splines therefore does not cause the boundaries to be stretched across two triangles. The variation in shape of facial features such as the shape of eyebrows or eyes is therefore primarily encoded by the variation in the location of the vertices of the triangulation rather than differences in generated morphed images used to determine colouring for generated models and when Eigen vectors are determined, variation in colouring of facial features such as eyebrows or lips are constrained within a limited number of triangles. As all the morphed images each comprises images where the boundaries of the facial features are sharp, all the generated Eigen vectors will also necessarily generate sharp images.

Figure 5:
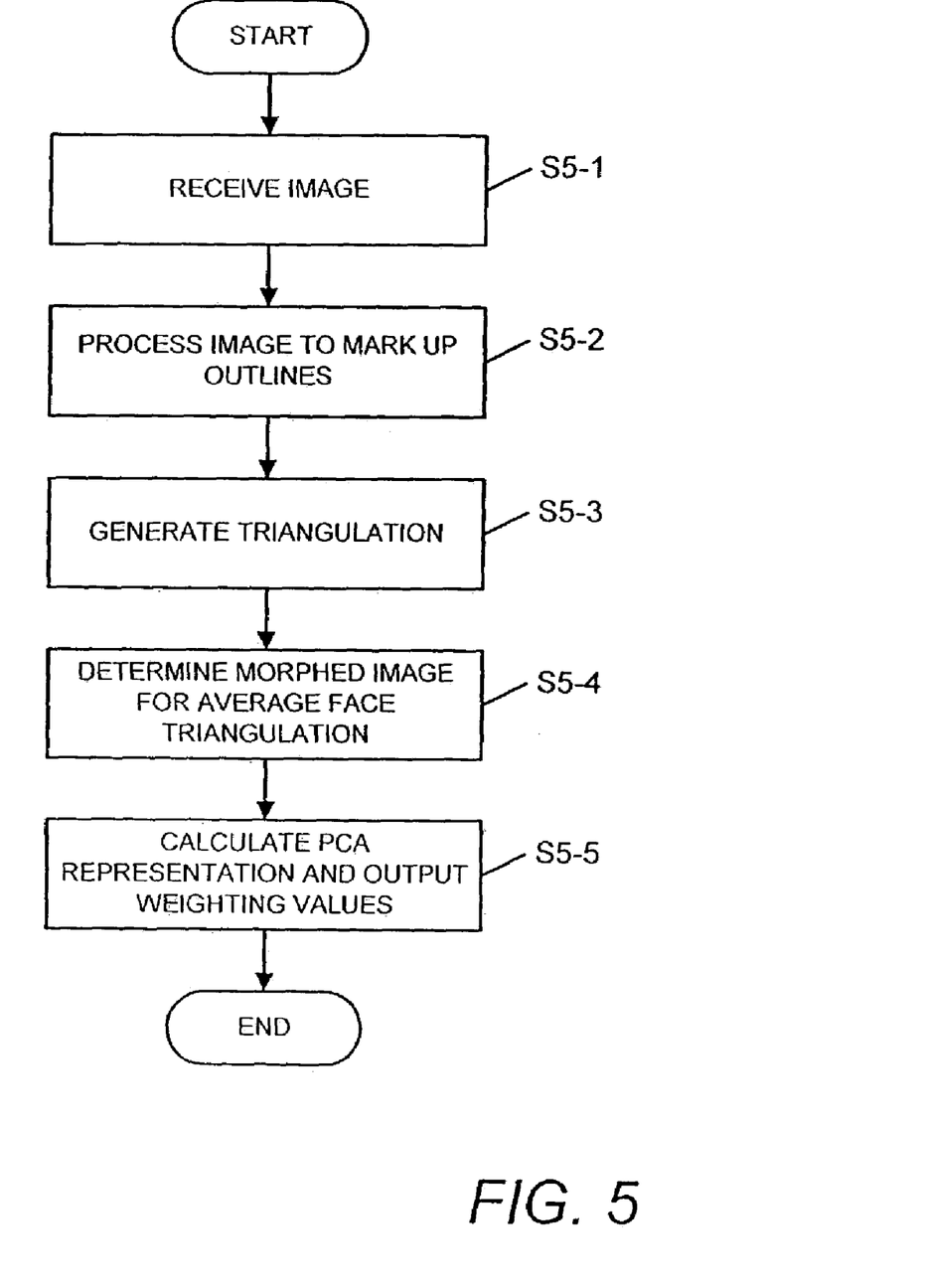
FIG. 5 is a flow diagram of the generation of a set of weighting values for an individual user of the communications network of FIG. 1.

The generation of a three dimensional representation of a user of one of the mobile phones 1-1;1-N will now be described with reference to FIGS. 5–7.

Prior to describing the structure and processing of data by the mobile phones 1-1;1-N, the generation of a set of weighting values for a model of an individual by the model generation computer 3 will be described with reference to FIG. 5 which is a flow diagram of the processing of the model generation computer 3.

Initially (S5-1) the model generation computer 3 receives from a mobile phone 1-1;1-N via the communications network 5, image data of an individual taken utilising the camera 7 of the mobile phone 1-1;1-N.

When an image has been received by the model generation computer 3, the model generation computer 3 then passes the image to the matching unit 20 which processes (s5-2) the image to identify within the image points corresponding to points outlining the face in the image and points outlining the eyebrows, eyes, nose and lips in the image and points identifying the centres of the eyes, the bridge of the nose and the lip line on the image as has previously been described with reference to FIG. 3. In this embodiment, these points are automatically identified by the matching unit 20 utilising conventional feature recognition techniques.

When the co-ordinates of the points outlining the face and facial features of the image, the centres of the eyes, the bridge of the nose and lip line have been determined the matching unit 20 then (S5-3) generates from the co-ordinates a dense triangulation of the face in the same manner as been previously described in relation to FIG. 4.

The co-ordinates of the vertices of this dense triangulation in which edges of triangles outline the main features of the face are then utilised to generate (s5-4) a morphed image in which points corresponding to vertices of the calculated triangulation are positioned in the average position for the average face stored as part of the face model 21. The generated morphed image and the co-ordinates of the vertices of the generated triangulation are then processed (s5-5) to determine the manner in which the morphed image and co-ordinates vary relative to the average face and average co-ordinate positions for the face model 21. A set of Eigen values for modelling the determined difference are calculated and then output by the model generation computer 3 via the communication network 5 back to the mobile phone 1-1;1-N from which the original image data was received.

The detailed structure of the mobile phone 1-1-1-N will now be described with reference to FIG. 6 prior to describing the processing of output weighting values to generate a three dimensional model of a face during the making of a telephone call between the telephone 1-1-1-N.

Figure 6:
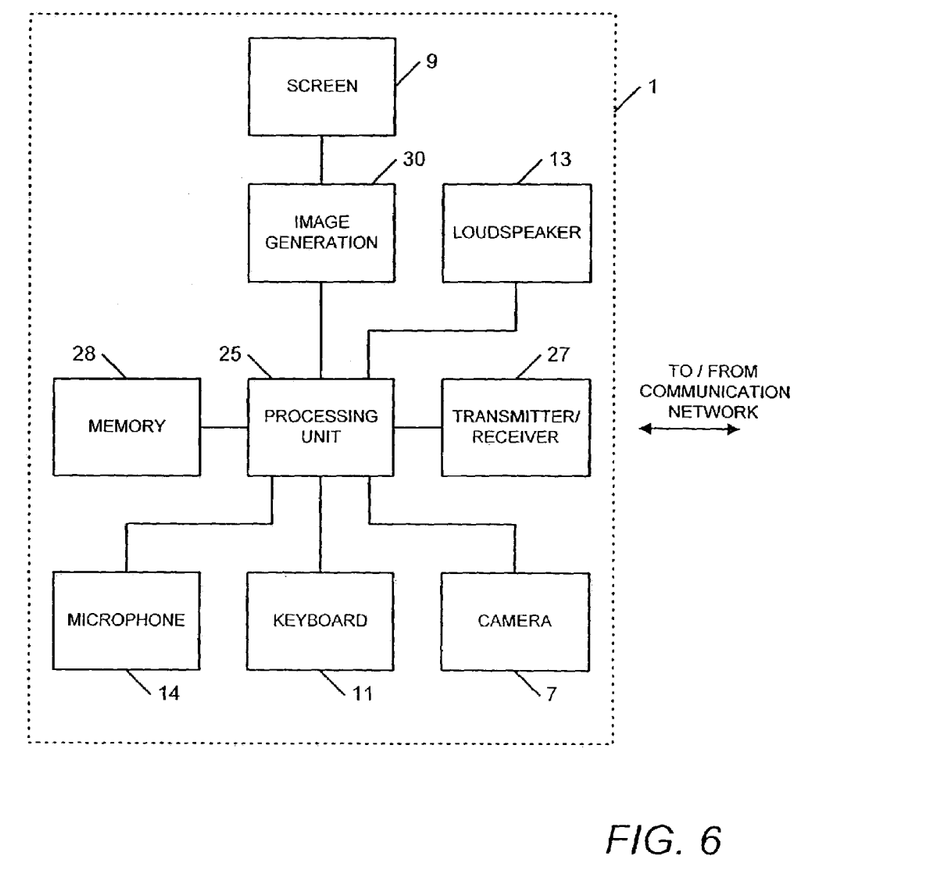
FIG. 6 is a schematic block diagram of a mobile phone of the communications network of FIG. 1.
Figure 7:
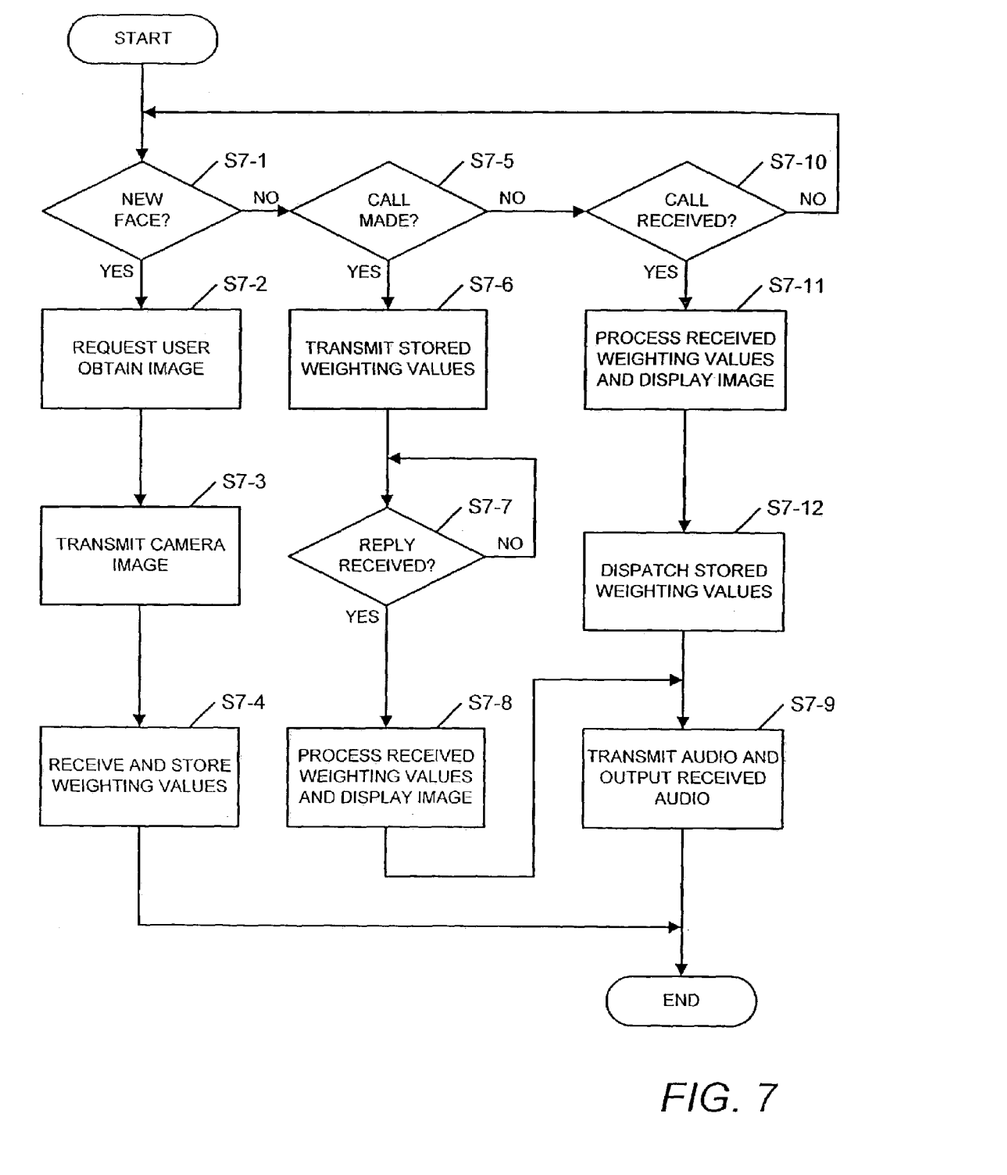
FIG. 7 is a flow diagram of the processing of data by the mobile phone of FIG. 6.

FIG. 6 is a schematic block diagram of a mobile phone 1 for use with the communication network 5 of FIG. 1.

In this embodiment, each of the mobile phones 1-1-1-N comprises a processing unit 25 which is connected to the keyboard 11, the camera 7, the loudspeaker 13 and microphone 14 of the phone 1. In addition the processing unit 25 is also connected to a transmitter/receiver 27 and a memory 28 for storing weighting values for modelling images of individuals. The processing unit 25 is also connected to the screen 9 of the phone 1 via an image generation module 30. The image generation module 30 incorporates a copy of the face model 21 stored on the model generation computer 3, which enables the image generation module 30 to generate images of individuals utilising weighting data received by the phone 1 via the transmitter/receiver 27.

The processing of data by the processing unit 25 and image generation module 30 of a mobile phone 1 in accordance with this embodiment of the present invention will now be described in detail with reference to FIG. 7.

The processing unit 25 initially (s7-1) determines whether any data has been input via the keyboard 11 indicating that the user of the phone 1 wishes to generate a new face model for storage within the memory 28 of the phone 1.

If this is the case, the processing unit 25 then (s7-2) causes a prompt to appear on the screen 9 of the phone 1 requesting the user to take a photograph of an individual using the camera 7 of the phone 1.

When an image has been obtained using the camera 7 the image is then (s7-3) transmitted via the transmitter/receiver 27 and the communications network 5 to the model generation computer 3 where it is then processed in the manner which has previously been described with reference to FIG. 5. As a result of the processing of the image data, the model generation computer 3 outputs a set of weighting values to the phone 1. When these weighting values are received (s7-4) they are passed by the processing unit 25 to the memory 28 where they are stored.

If the processing unit 26 determines (s7-1) that a request for storing a new set of weighting values has not been entered, the processing unit 25 then (s7-5) determines whether a telephone number has been entered using the keyboard 11. If this is the case, the mobile phone then connects to the phone 1 identified by the telephone number via the communications network 5 in a conventional manner. The mobile phone 1 then transmits (s7-6) via the communication network 5 the set of weighting values currently stored in the memory 28.

The processing unit 25 then waits (s7-7) until a reply is received from the telephone being called via the communication network 5 and the transmitter/receiver 27. When a reply is received the reply will include a further set of weighting values. The processing unit 25 then passes these further weighting values to the image generation module 30 which then processes them to generate an image of the receiver of the call which is displayed on the screen 9.

Specifically, as has been stated previously, the image model generation module 30 includes a copy of the Eigen vectors and average face data stored as a face model 21 within the model generation computer 3. When weighting values are received by the image generation module 30, the module determines a model representation of the caller by multiplying the Eigen vectors of the stored face model 21 by the corresponding weighting values for those Eigen vectors. Using conventional techniques, the generated model is then utilised to generate images of a 3D representation of a caller on the screen 9.

Once an image of a caller has been calculated and displayed on the screen 9 of the phone 1, the phone 1 then proceeds to transmit audio data received via the microphone 14 and output received audio data received via the transmitter/receiver 27 out through the loudspeaker 13 in a conventional manner.

If the processing unit determines (s7-5) that no call has been made using the keyboard 11, the processing unit 25 then determines whether data indicating a call has been received has been received by the transmitter/receiver 27. If this is not the case the processing unit 25 then once again checks (s7-1) whether data indicating that weighting values for a new face are to be stored has been entered via the keyboard 11.

If the processing unit 25 determines (s7-10) that a call has been received via the transmitter/receiver 27, the data received will include a set of weighting values. The processing unit 25 then (s7-11) processes received weighting values by passing these values to the image generation module 30 which generates an image of the caller in the same way as has previously been described in relation to generating the image of an individual being called (s7-8).

Once an image of the individual calling has been calculated and displayed on the screen 9, the processing unit 25 (s7-12) then causes the set weighting values previously stored within the memory 28 of the phone 1 to be dispatched via the transmitter/receiver 27 and the communications network 5 to the phone 1 from which a call has been received. The processing unit 25 then causes audio data received by the microphone 14 to be transmitted via the transmitter/receiver 27 and an audio data received by the transmitter/receiver 27 to be output by the loudspeaker 13 in a conventional manner (s7-9).

Second Embodiment

A second embodiment, of the present invention will now be described in which the mobile phones 1-1-1-N are adapted to enable a user to enter co-ordinate data for generating a triangulation of an image. Thus, instead of the matching unit 20 processing images to identify facial features, this co-ordinate data is transmitted via the communications network 5 to the model generation computer 3 where weighting values are calculated in the manner which has been previously described. In this embodiment, as the matching unit 20 does not have to identify the locations of facial features less processing power is required by the model generation computer 3, The marking up of images and entry of co-ordinates outlining facial features in an image will now be described in detail with reference to FIGS. 8, 9A and 9B.

Figure 8:
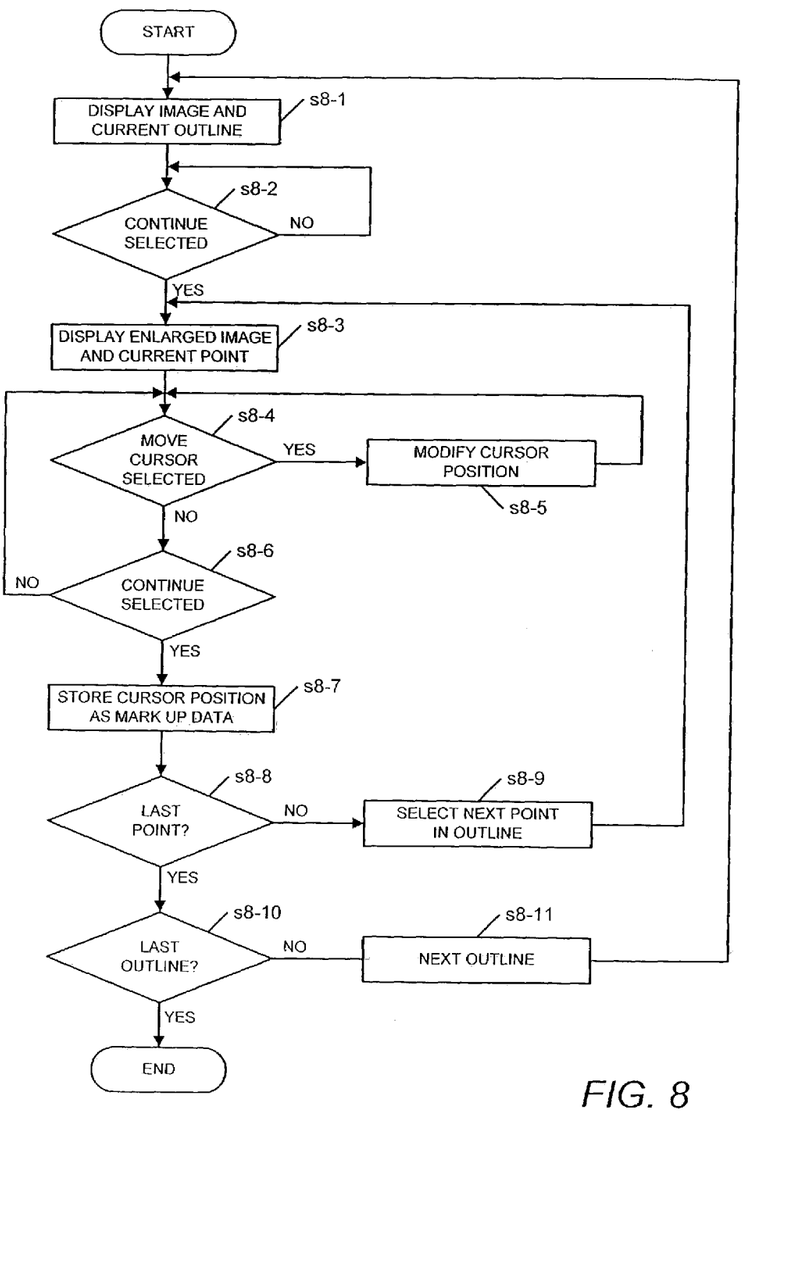
FIG. 8 is a flow diagram of the processing of a mobile phone of a second embodiment of the present invention.

FIG. 8 is a flow diagram of the processing for inputting co-ordinates of features appearing in an image obtained using the camera 7 of the phone 1. Initially (s8-1) the processing unit 25 causes an image obtained by the camera 7 to be displayed on the screen 9 with a set of control points being superimposed on the image.

Figure 9A:
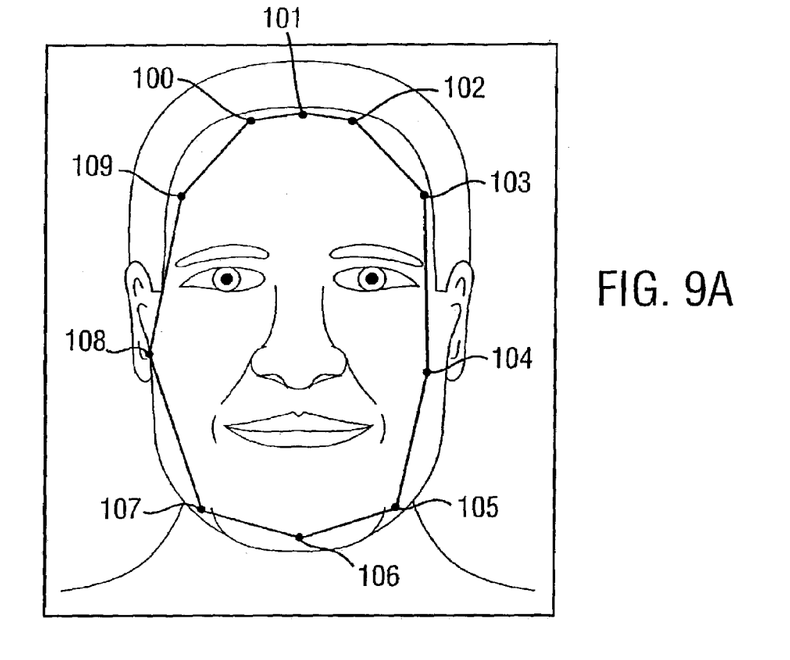
FIGS. 9A and 9B are exemplary illustrations of the input of feature point data.

FIG. 9A is an illustrated example of an image of a face with a set of control points 100–109 being superimposed upon the image. In this embodiment, initially ten control points 100–109 are shown positioned approximately around the outer edge of the face.

The processing unit 25 then (s8-2) waits until the processing unit 25 detects that the continue button has been selected on the keyboard 11. When this is detected the processing unit 25 causes an enlarged portion of the previously displayed image to be displayed (28-3) on the screen 9 where the portion selected comprises a portion centred on the next point for which feature co-ordinate data is to be entered.

Figure 9B:
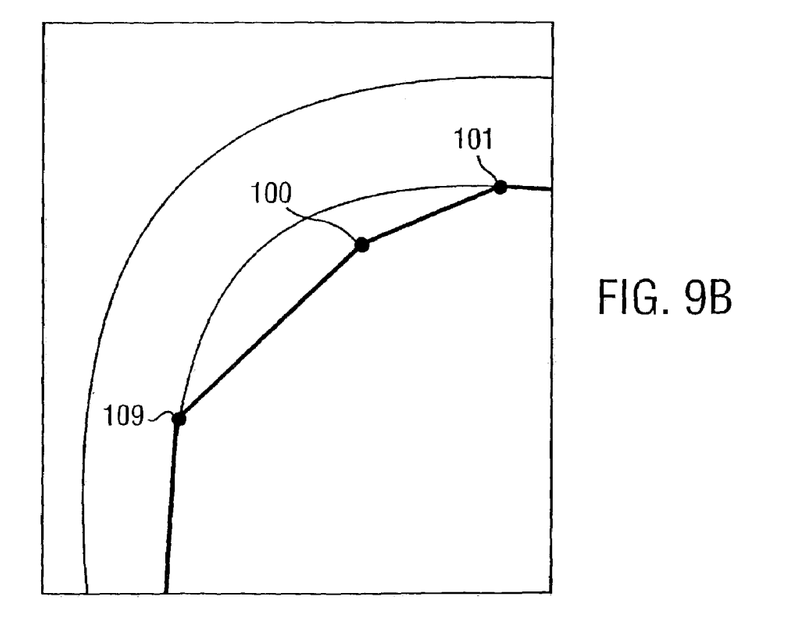

FIG. 9B is an exemplary illustration of an enlarged portion of the top left corner of the image of FIG. 9A. In the centre of FIG. 9 there is shown a control point 100.

The processing unit 25 then (s8-4) determines whether the user has pressed on the keyboard a button associated with movement of a cursor. Such a button can either be one of the buttons on the number keypad or a dedicated cursor control button on the keyboard 11. If this is the case the processing unit 25 then (s8-5) modifies the image on the screen 9 moving the control point 100 in the centre of the screen in the direction indicated by the selected button. The processing unit 25 then determines once again whether a move cursor button has been selected (s8-4).

Thus in this way a user is able to alter the position of the control point 100 relative to the image of the user obtained by the camera 7 and displayed on the screen 9 of the phone 1 so that the user can cause the control point to be matched with a feature on the image. Thus in the case of control point 100 shown in FIG. 9B which is intended to be a control point identifying one of the points of the outside edge of a face a user would move the cursor and the control point 100 so that it matches up with the edge of the face.

If the processing unit 25 determines that a move cursor button has not been selected (sB-4) the processing unit 25 then determines whether a continue button has been selected (s8-6). If this is not the case, the processing unit 25 checks once again whether the cursor button has been selected (s8-4).

If the processing unit 25 determines the continue button has been selected (s8-6) the processing unit 25 then stores data identifying the co-ordinate location of the control point 100 as the co-ordinate location of a feature point on the image displayed on the screen 9. The processing unit 25 then (s8-8) determines whether the 'feature point' for which a co-ordinate location has been stored is the last feature point on the outline. If this is not the case, the processing unit 25 then (s8-9) selects the next point in the outline and then (s8-3) displays an enlarged image centred on that next point before enabling a user to alter the position of the newly selected point so that co-ordinates for that feature point may be stored.

Thus in this way the user is able to input using only the keyboard 11 co-ordinate data for each of the feature points identified on the outline where the co-ordinate of the feature points match the position of a portion of the image displayed on the screen 9.

When co-ordinate data for all of the feature points 100–109 of an outline have been stored the processing unit 25 then (s8-10) determines whether the outline for which co-ordinates have just been entered is the last outline for which feature points are to be entered. In this embodiment the processing unit 25 is arranged to enable a user to enter co-ordinate data for the location of the outlines of a user's face, eyes, eye brows, lips and nose, the centres of a users eyes and lines defining the bridge of the nose and lip line appearing in an image from the screen 9.

Once data for the outline of an individual's face has been entered a set of control points for the outline of the next feature for which co-ordinate data has to be entered is shown superimposed on the image. By having a user enter co-ordinate data for the outline of the face initially, the relative scale of the image can be determined and hence later initial outlines can be placed in an estimated approximate position for that feature.

If once co-ordinate data has been entered for an outline it is determined (s8-10) that another outline is still required the next outline is then selected (s8-11) and then a user is prompted to enter co-ordinate data for that next feature by the display (s8-3) of an enlarged image centred on the next control point for which co-ordinate data is to be entered. Thus in this way a user is prompted to enter co-ordinate data for all the outlines of the various features appearing in the image.

When all the required co-ordinate data has been entered, the co-ordinate data and image data are then transmitted via the communications network 5 to the model generation computer 3 which generates a dense triangulation utilising the co-ordinate data and outputs weighting values in the same way as has previously been described in relation to the first embodiment.

FURTHER EMBODIMENTS AND MODIFICATIONS

Although in the above described embodiment a system for generating 3D models of individuals is described, it will be appreciated that the present invention is equally applicable to the generation of 2D models.

Although in the previous embodiments, systems have been described in which weighting values for generating images have been calculated utilising a separate model generation computer 3, it will be appreciated that provided sufficient processing power was available, the calculation of weighting values could in other embodiments, take place within the mobile phones 1-1-1-N themselves.

Further, although in the above described embodiments systems for generating images on mobile phones have been described, it will be appreciated that the present invention is applicable to any principle component analysis modelling system for generating images of faces of individuals or other models where blurring around portions of images is to be avoided.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

Although in the above embodiments, systems for modelling faces have been described, it will be appreciated that the present invention is more generally applicable. Specifically, the present invention may be utilised to model for example whole heads rather than only faces or alternatively larger portions of an individual (e.g. head and shoulders) or even for generating full body models.

The invention claimed is:

1. A method of generating a principal component anaylsis model for representing individuals, the method comprising:
   receiving a plurality of images of individuals and associated co-ordinate data identifying for each image the co-ordinates of points corresponding to predetermined features of said individuals;
   for each of said images, utilizing said co-ordinate data to determine a mesh for each image, said mesh comprising a number of vertices connected by edges, the edges of said mesh dividing each said image into a number of image portions; and
   generating a principal component analysis model for representing individuals utilizing determined variations of the co-ordinates of the vertices of said meshes for said images and determined variations of corresponding image portions of said images,
   wherein said determination of a mesh for each image comprises generating a mesh wherein the boundaries of facial features in an image lie substantially along the edges of image portions defined by said mesh by;
   connecting said points corresponding to predetermined features in a predetermined manner to triangulate said image into a number of triangles;
   determining the centroids of a number of said triangles calculated by connecting said co-ordinates of points corresponding to predetermined features of said individuals; and
   sub-dividing said triangles utilizing the co-ordinates for said centroids.

2. A method in accordance with claim 1, wherein said co-ordinate data comprises data identifying the co-ordinate locations of points outlining at least one of the face, eyes, nose, eyebrows and mouth of an individual in said images.

3. A method in accordance with claim 1, wherein said co-ordinate data comprises co-ordinates identifying points corresponding to at least one of the bridge of the nose of an individual in said images and the lip line of an individual in said images.

4. A method in accordance with claim 1 further comprising:
   receiving 3D co-ordinate data for a shape of each of said individuals in said images;
   wherein said generation of a principle component analysis model utilizes determined 3D co-ordinates of points corresponding to the co-ordinates of vertices in said meshes determined from said received 3D co-ordinate data.

5. An apparatus for generating a set of weighting values for creating a model of an individual, said apparatus comprising:
   a data store operable to store a principal component analysis model generated in accordance with claim 1;
   an image receiver operable to receive an image of an individual to be modelled;
   a mesh determination unit operable to determine for an image to be modelled received by said image receiver a mesh dividing said image into a number of image portions, wherein said mesh comprises a mesh in which the boundaries of facial features in said image lie substantially along the edges of image portions defined by said mesh; and
   a calculation unit operable to calculate weighting values for representing said image to be modelled utilizing a determined mesh by said determination unit and said principle component analysis model stored in said data store.

6. An apparatus in accordance with claim 5, wherein said mesh determination unit is operable to identify in an image received by said image receiver the co-ordinates of a number of points corresponding to predetermined features of an individual in said received image and utilizing said co-ordinates to generate said mesh.

7. An apparatus in accordance with claim 6, wherein said co-ordinates comprises co-ordinates identifying the co-ordinate locations of points outlining at least one of the face, eyes, nose, eyebrows and mouth of the individual in said image received by said image receiver.

8. An apparatus in accordance with claim 7, wherein said co-ordinates further comprise co-ordinates identifying points corresponding to at least one of the bridge of the nose of an individual in said image received by said image receiver and the lip line of the individual in said image received by said image receiver.

9. An apparatus in accordance with claim 6, wherein said mesh determination unit is operable to determine a mesh by connecting said points corresponding to a predetermined features in a predetermined manner to triangulate said image to be modelled into a number of image portions.

10. An apparatus in accordance with claim 9, wherein said mesh determination unit is operable to generate said triangulation of an image by determining the centroids of a numbers of triangles calculated by connecting said co-ordinate of points corresponding to predetermined features of said individual and sub-dividing said triangles utilizing the co-ordinates for said centroids.

11. An apparatus in accordance with claim 6, wherein said mesh determination unit further comprises:
an image display operable to display received images received by said image receiver; and
an interface operable to receive user input identifying the co-ordinates of points corresponding to predetermined features of said individuals in images displayed in said image display.

12. A data storage medium storing computer implementable process steps for causing a programmable computer to perform a method in accordance with claim 1.

13. A data storage medium in accordance with claim 12, comprising a computer disc.

14. A data storage medium in accordance with claim 13, wherein said computer disc comprises an optical, magneto-optical or magnetic disc.

15. A method of generating a set of weighting values for creating a model of an individual, said method comprising:
receiving a plurality of images of individuals and associated co-ordinate data identifying for each image the co-ordinates of points corresponding to predetermined features of said individuals;
for each of said images, utilizing said co-ordinate data to determine a mesh for each image, said mesh comprising a number of vertices connected by edges, the edges of said mesh dividing each said image into a number of image portions;
generating and storing a principal component analysis model for representing individuals utilizing determined variations of the co-ordinates of the vertices of said meshes for said images and determined variations of corresponding image portions of said images, wherein said determination of a mesh for each image comprises generating a mesh wherein the boundaries of facial features in an image lie substantially along the edges of image portions defined by said mesh;
receiving an image of an individual to be modelled;
determining for said image to be modelled a mesh comprising a number of vertices connected by edges, said edges dividing said image to be modelled into a number of image portions, wherein said mesh comprises a mesh in which the boundaries of facial features in said image to be modelled are substantially along the edges of image portions defined by said mesh; and
calculating weighting values for representing said image to be modelled utilizing said determined mesh for said image to be modelled and said stored principle component analysis model.

16. A method in accordance with claim 15, wherein said determined mesh for said image to be modelled is determined utilizing co-ordinates identifying for said image to be modelled the co-ordinates of points corresponding to predetermined features of the individual to be modelled in said image.

17. A method in accordance with claim 16, wherein said co-ordinates comprises co-ordinates identifying the co-ordinate locations of points outlining at least one of the face, eyes, nose, eyebrows and mouth of the individual in said image to be modelled.

18. A method in accordance with claim 17, wherein said co-ordinates further comprises co-ordinates identifying points corresponding to at least one of the bridge of the nose of an individual in said image and the lip line of the individual in said image.

19. A method in accordance with claim 16, wherein said determination of a mesh for said image to be modelled comprises determining a mesh by connecting said points corresponding to predetermined features in a predetermined manner to triangulate said image to be modelled into a number of image portions.

20. A method in accordance with claim 19, wherein said generation of a triangulation of said image to be modelled further comprises determining the centroids of a number of triangles calculated by connecting said co-ordinates of points corresponding to predetermined features of said individual and sub-dividing said triangles utilizing the co-ordinates for said centroids.

21. A method in accordance with claim 16, further comprising identifying points in said image to be modelled corresponding to the features of said individual.

22. A method in accordance with claim 21, wherein said identifying points corresponding to predetermined features of said individual comprises:
displaying a received image of an individual to be modelled; and
receiving user input identifying the co-ordinates of points corresponding to predetermined features of said individual in said displayed image.

23. A method of displaying an image of an individual comprising:
receiving a plurality of images of individuals and associated co-ordinate data identifying for each image the co-ordinates of points corresponding to predetermined features of said individuals;
for each of said images, utilizing said co-ordinate data to determine a mesh for each image, said mesh comprising a number of vertices connected by edges, the edges of said mesh dividing each said image into a number of image portions;
generating and storing a principal component analysis model for representing individuals utilizing determined variations of the co-ordinates of the vertices of said meshes for said images and determined variations of corresponding image portions of said images, wherein said determination of a mesh for each image comprises generating a mesh wherein the boundaries of facial features in an image lie substantially along the edges of image portions defined by said mesh;

receiving an image of an individual to be modelled;

determining for said image to be modelled a mesh comprising a number of vertices connected by edges, said edges dividing said image into a number of image portions, wherein said mesh comprises a mesh in which the boundaries of facial features in said image be substantially along the edges of image portions defined by said mesh;

calculating weighting values for representing said image to be modelled utilizing said determined mesh for said image to be modelled and said stored principle component analysis model; and displaying an image generated utilizing said generated weighting values and said stored principle component analysis model.

24. An apparatus for generating a principal component analysis model for representing individuals, the apparatus comprising:

a receiver operable to receive images of individuals and associated co-ordinate data identifying for each image the co-ordinates of points corresponding to predetermined features of said individuals;

a processing unit operable for each image received by said receiver to utilize said co-ordinate data received by said receiver associated with said image to determine a mesh for said image, said mesh comprising a number of vertices connected by edges, the edges of said mesh dividing each said image into a number of image portions; and a model generation unit operable to generate a principal component analysis model for representing individuals utilizing determined variations of the co-ordinates of the vertices of said meshes for said images and determined variations of corresponding image portions of said images determined by said processing unit, wherein said processing unit is operable to determine a mesh for an image received by said receiver by generating a mesh wherein the boundaries of facial features in an image lie substantially along the edges of image portions defined by said mesh by:

connecting said points corresponding to predetermined features in a predetermined manner to triangulate said image into a number of triangles;

determining the centroids of a number of triangles calculated by connecting said co-ordinates of points corresponding to predetermined features of said individuals; and sub-dividing said triangles utilizing the co-ordinates for said centroids.

25. An apparatus in accordance with claim 24, wherein said receiver is operable to receive co-ordinate data comprising data identifying the co-ordinate locations of points outlining at least one of the face, eyes, nose, eyebrows and mouth of an individual in images received by said receiver.

26. An apparatus in accordance with claim 24, wherein said receiver is operable to receive co-ordinate data comprising co-ordinate identifying points corresponding to at least one of the bridge of the nose of an individual in images received by said receiver and the lip line of an individual in images received by said receiver.

* * * * *

UNITED STATES PATENT AND TRADEMARK OFFICE
CERTIFICATE OF CORRECTION

| | |
|---|---|
| PATENT NO. | : 7,171,029 B2 |
| APPLICATION NO. | : 10/424919 |
| DATED | : January 30, 2007 |
| INVENTOR(S) | : Rowe |

It is certified that error appears in the above-identified patent and that said Letters Patent is hereby corrected as shown below:

COLUMN 1:
Line 10, "principle" should read -- principal --;
Line 18, "principle" should read -- principal --;
Line 37, "principle" should read -- principal --; and
Line 60, "principle" should read -- principal --.

COLUMN 2:
Line 1, "principle" should read --principal --;
Line 9, "principle" should read -- principal --;
Line 13, "principle" should read -- principal --; and
Line 59, "I-N;" should read -- I-N, --.

COLUMN 3:
Line 2, "principle" should read -- principal --;
Line 7, "principle" should read -- principal --;
Line 36, "principle" should read -- principal --;
Line 50, "principle" should read -- principal --; and
Line 61, "three dimensional principle" should read -- three-dimensional principal --.

COLUMN 4:
Line 25, "of" should be deleted.
Line 36, "principle" should read -- principal --;
Line 49-54,
"The most significant Eigen vectors together with data identifying the average 3D co-ordinates for the vertices for the dense triangulation of the faces and an average 3D morphed image stored by the model generation computer 3 as the principle component analysis face model 21." should read
-- The most significant Eigen vectors, together with data identifying the average 3D co-ordinates for the vertices for the dense triangulation of the faces, and an average 3D morphed image stored by the model generation computer 3, are then stored as the principal component analysis face model 21. --;
Line 53, "principle" should read -- principal --; and
Line 55, "principle" should read -- principal --.

UNITED STATES PATENT AND TRADEMARK OFFICE
CERTIFICATE OF CORRECTION

| | |
|---|---|
| PATENT NO. | : 7,171,029 B2 |
| APPLICATION NO. | : 10/424919 |
| DATED | : January 30, 2007 |
| INVENTOR(S) | : Rowe |

It is certified that error appears in the above-identified patent and that said Letters Patent is hereby corrected as shown below:

COLUMN 5:
Line 64, "telephone" (second occurrence) should read -- telephones --.

COLUMN 8:
Line 66, "required" should read -- required, --.

COLUMN 9:
Line 31, "principle" should read -- principal --.

COLUMN 10:
Line 21, "by;" should read -- by: --; and
Line 66, "principle" should read -- principal --.

COLUMN 11:
Line 8, "comprises" should read -- comprise --;
Line 20, "to a" should read -- to --; and
Line 26, "numbers" should read -- number --.

COLUMN 12:
Line 10, "principle" should read -- principal --;
Line 19, "comprises" should read -- comprise --; and
Line 24, "comprises" should read -- comprise --.

UNITED STATES PATENT AND TRADEMARK OFFICE
CERTIFICATE OF CORRECTION

PATENT NO. : 7,171,029 B2
APPLICATION NO. : 10/424919
DATED : January 30, 2007
INVENTOR(S) : Rowe It is certified that error appears in the above-identified patent and that said Letters Patent is hereby corrected as shown below:

COLUMN 13:
Line 10, "be" should read -- lie --;
Line 15, "principle" should read -- principal --; and
Line 18, "principle" should read -- principal --.

Signed and Sealed this

Twenty-sixth Day of February, 2008

JON W. DUDAS
*Director of the United States Patent and Trademark Office*